March 28, 1933.  E. A. ROCKWELL  1,903,138
BRAKE OPERATING MECHANISM
Filed Jan. 31, 1930  3 Sheets-Sheet 1
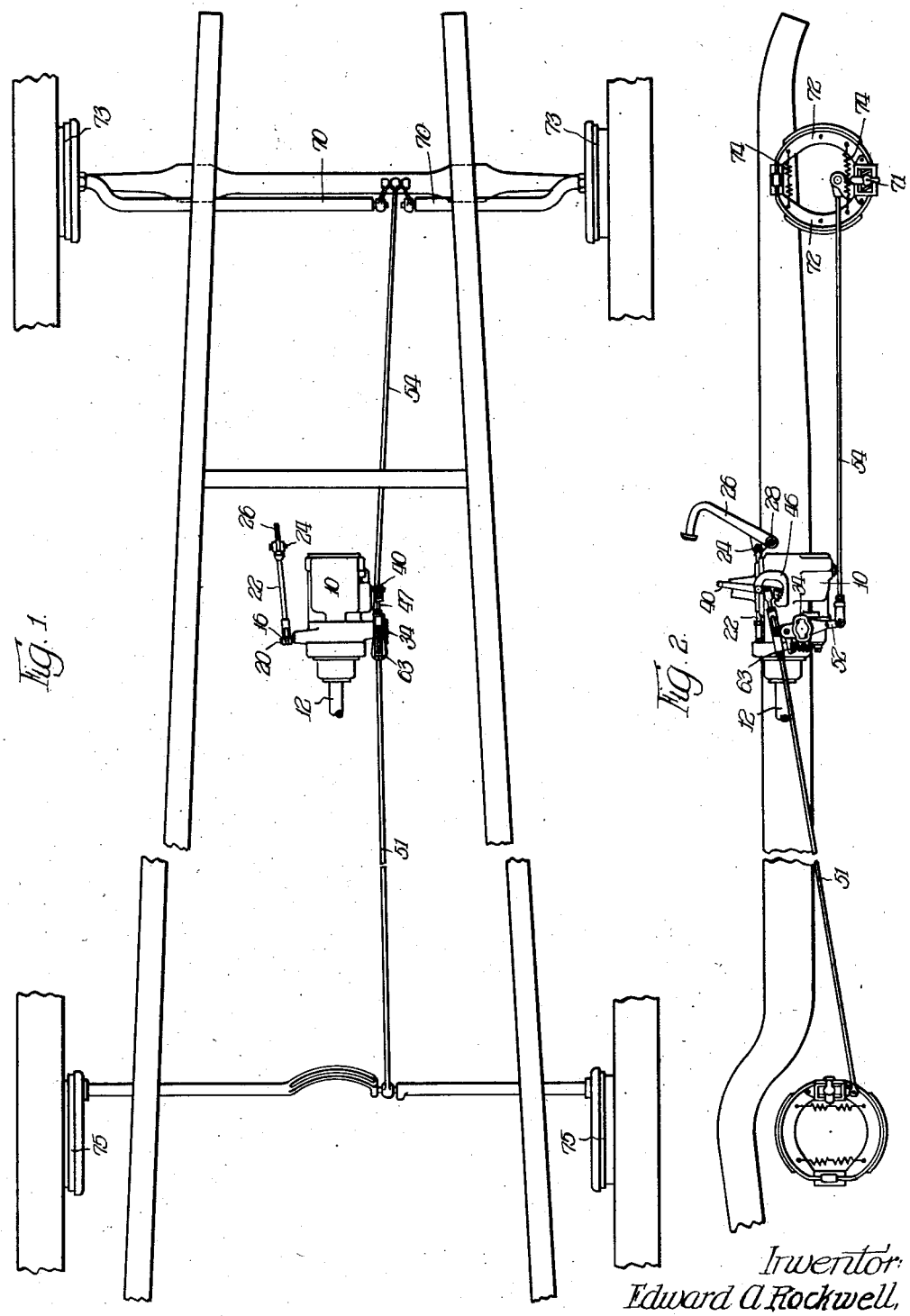
Inventor:
Edward A. Rockwell, March 28, 1933. E. A. ROCKWELL 1,903,138
BRAKE OPERATING MECHANISM
Filed Jan. 31, 1930   3 Sheets-Sheet 2
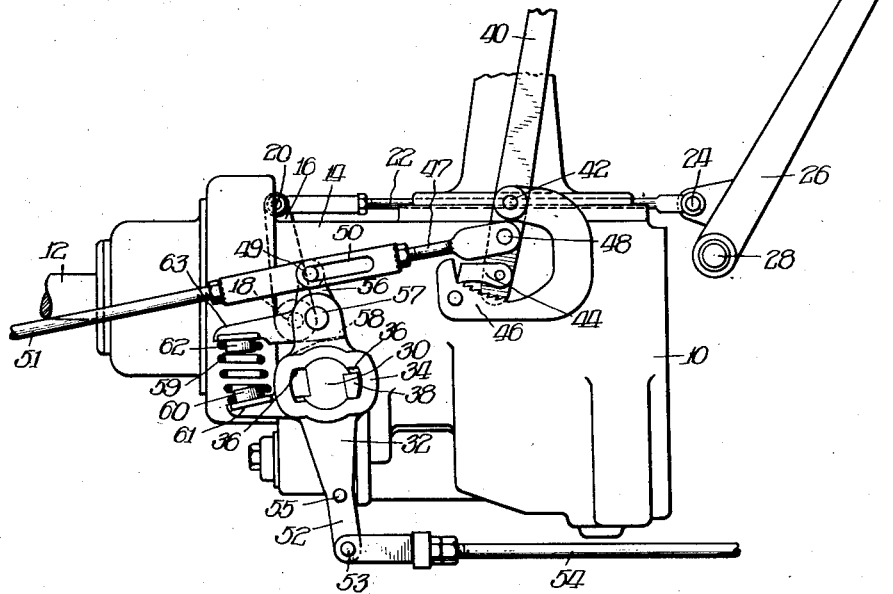
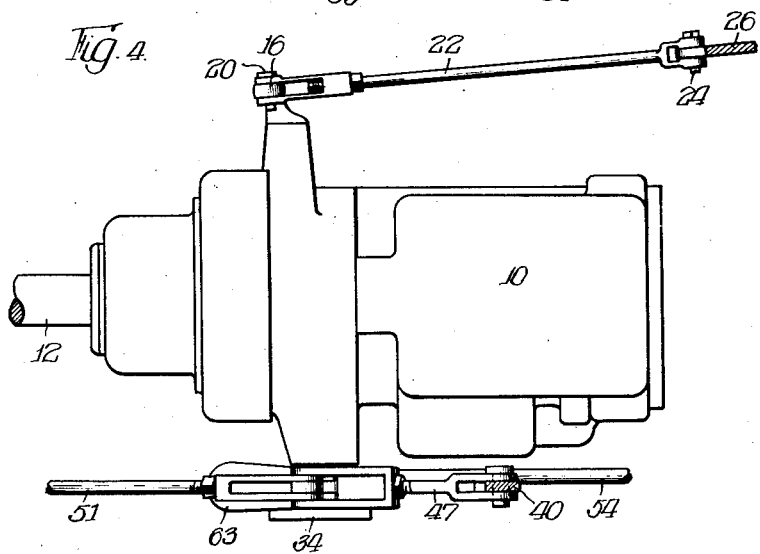
Inventor:
Edward A. Rockwell, March 28, 1933.  E. A. ROCKWELL  1,903,138
BRAKE OPERATING MECHANISM
Filed Jan. 31, 1930   3 Sheets-Sheet 3
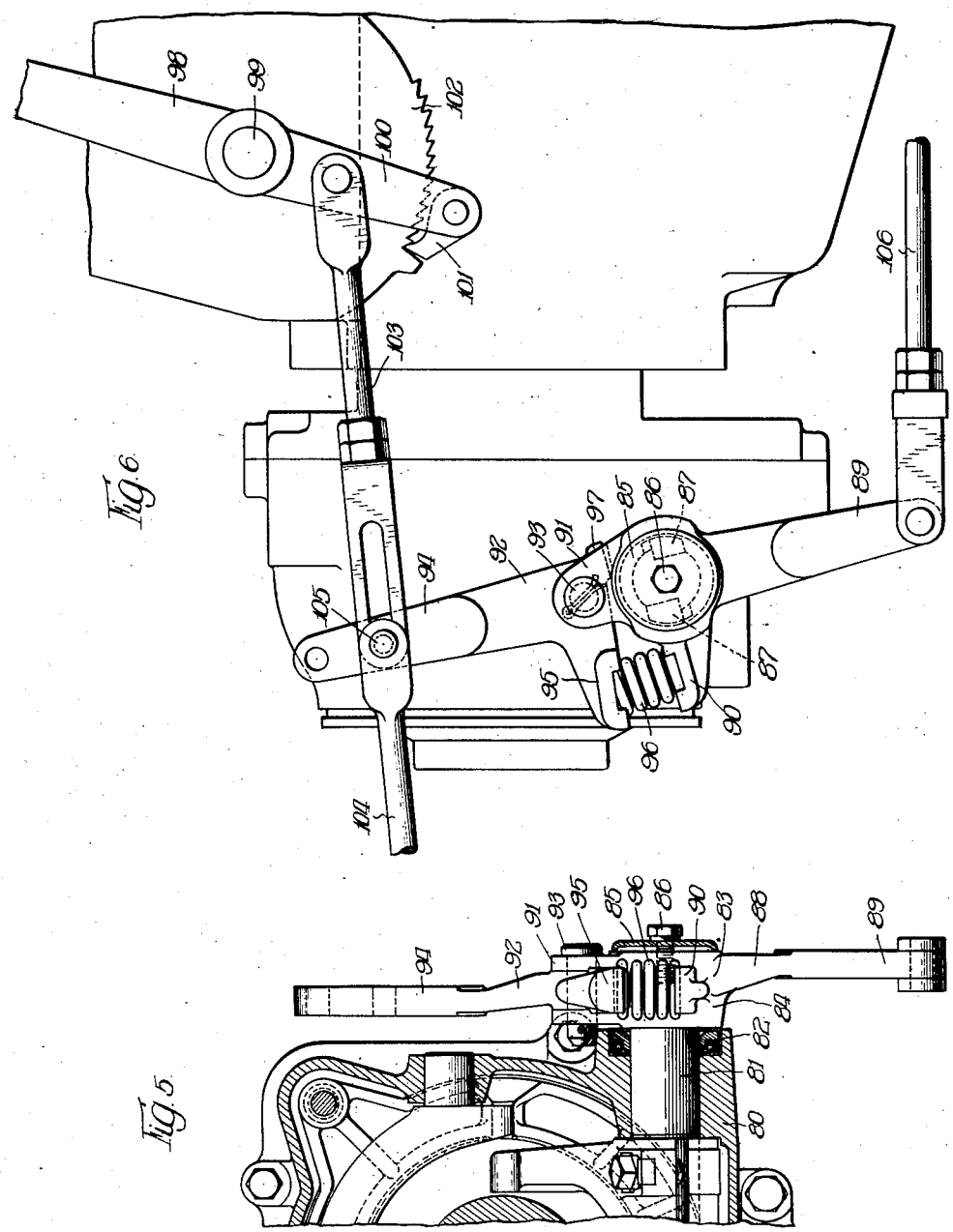
Inventor:
Edward A. Rockwell.

Patented Mar. 28, 1933

1,903,138

UNITED STATES PATENT OFFICE

EDWARD A. ROCKWELL, OF CHICAGO, ILLINOIS

BRAKE OPERATING MECHANISM

Application filed January 31, 1930. Serial No. 424,791.

This invention relates to brake operating mechanism applicable to be used in connection with motor vehicles for actuating the front and rear wheel brakes. More especially the present invention is concerned with improved means for distributing the braking pressure of a power brake unit to the front and rear wheel brakes in such a manner that a larger percentage of braking can be obtained at the front wheels than at the rear wheels.

Power brakes of the type to which the present invention is applicable are well known and comprise means selectively controlled by relatively light pedal pressure by the operator, which brings into action a primary brake acting on the propeller shaft of the vehicle and effectuates movement of an output member through the rotation of the shaft for pulling on the front and rear wheel brakes. In a preferred construction the output member of the power brake unit comprises a rock shaft which carries on its outer end the double arm distributing lever having connections through brake rods to the actuating cams for the front and rear wheel brakes. It has been found highly desirable that a larger percentage of the braking be obtained by the front wheel brakes than by the rear wheel brakes, one reason being that the braking done by the power brake is added to the retardation supplied by the rear wheel brakes and another reason being that the weight of the vehicle as it is retarded at high speeds is thrown towards the front wheels. A simple method of distributing higher pressures to the front wheel brakes than to the rear wheel brakes consists in the utilization of different mechanical leverages for the front brake linkage than for the rear brake linkage, but when such a construction is used with certain standard types of vehicles, it has been found that the entire engine frame which carries the power brake and the output rock shaft may yield slightly relative to the axes of the wheels and this movement tends to prevent the desired increased braking.

It is a purpose of the present invention to provide a construction in which the output force from a power brake device is efficiently distributed to provide increased braking on the front wheel brakes relative to the rear wheel brakes and in which construction the desired increased braking is obtained in spite of a shifting of the axis of the output rock shaft relative to the axes of the wheels.

It is further a purpose of the present invention to provide improved means for distributing the braking energy from a power braking device to the front and rear wheel brakes through connections so arranged that a non-resilient transmission of force is obtained to the front wheel brakes but that the transmission of the braking force to the rear wheel brakes is limited through the action of interposed resilient means.

It is an object of the invention to directly associate the improved means with the double armed lever which is actuated through movement of the rock shaft whereby upon reaching the desired braking pressure at the rear wheel brakes, the arm of the double arm lever which connects to the rear brake rod may yield with respect to the arm which connects to the front brake rod.

Another object of the invention consists in providing a construction as described above, in which the distributing lever has a resilient connection to the rear brake rod and a non-resilient connection to the front brake rod when operated by the power brake unit, but may be independently operated by manual control in such a manner that non-resilient connections are provided from both the arms of the double arm distributing lever to the front and rear wheel brakes.

Another feature of the present invention resides in the improved construction of the distributing lever whereby the power brake linkage may be installed on standard vehicles and adjusted to give the desired increased braking on the front by inserting a spring of the correct strength to compensate for different effective leverage to the rear which leverage cannot be readily modified or adjusted upon installation. It is desirable that the linkage to the emergency lever be substantially in line with the rear brake rod and thus the connection to the distributing lever is predetermined but a spring of the correct strength will adjust the maximum effective pressure to the rear brakes.

Further and additional objects and advantages of the present improvements will be more readily understood when pointed out in the detail in connection with the following description taken with the attached drawings, in which a preferred embodiment is illustrated.

In the drawings:

Figure 1 is a diagrammatic chassis layout illustrating the brake linkage;

Figure 2 is a side elevation of Figure 1;

Figure 3 is an enlarged side view of the power brake unit illustrating the improved distributing means;

Figure 4 is a plan view of Figure 3;

Figure 5 is a partial transverse section through the power brake unit and showing the mounting of a distributing lever in a modified manner; and Figure 6 is a partial side elevation of the modified arrangement of Figure 5.

For the purpose of the present disclosure it will not be necessary to describe in detail the operative parts of the power brake unit, since such constructions are readily understood and well known in the art. In the drawings a portion of the vehicle chassis is illustrated in which 10 is a transmission casing surrounding a propeller shaft 12 which extends into the casing. Immediately in rear of the transmission housing 10 is a power brake housing 14. As shown in Figure 1, input lever arm 16 is provided, mounted on a pivotal rock shaft 18, which extends into the power brake housing. The arm 16 has a pivotal connection 20 to which is attached adjustable linkage 22 connecting to a pivot 24 carried by a pedal lever 26, the pedal lever 26 being pivoted on a shaft 28, suitably carried by the engine frame.

From the side of the power brake housing opposite to that of the lever arm 16 extends an output rock shaft 30. It will be readily understood that movement of the pedal 26 will cause movement of the input lever arm 16 and thus bring the power brake into action, whereupon movement of the propeller shaft 12 will cause the output rock shaft 30 to be rotated in a clockwise direction. In the usual construction, the double arm lever 32 is mounted on the outwardly extending end of the rock shaft 30. The lever 32 may be formed with an enlarged hub 34 and recesses 36 elongated relative to buttress keys 38 which couple the lever arm to the rock shaft. The purpose of the buttress keys cooperating with the elongated recesses is to permit movement of the double arm lever without actuation of the brake rock shaft. Thus it is customary to utilize an emergency manual control lever 40 which may be pivoted as at 42 and provided with a ratchet 44, engaging the curved rack 46 to hold it in braking position. The emergency lever is connected in such a manner that both the front and rear wheel brakes may be directly pulled on by its movement. Thus there is an adjustable linkage 47 extending between the pivot 48 for the emergency lever and a pivot 49 which is associated with the double arm lever 32. As far as the operation of the double arm lever by the manual control is concerned, the pivot 49 may be considered as fixed to an upwardly extending arm of the lever 32, which is the usual construction.

The linkage 47 has a lost motion slot 50 in its connection to the pivot 49, which permits movement of the lever 32 without disturbing the emergency lever. A rear brake rod 51 also connects to the pivot 49, while the lower arm 52 of the lever 32 has a connection 53 for a forwardly extending brake rod 54. An additional opening 55 is provided in the arm 52, to which the front brake rod 54 may be connected with a shorter effective leverage.

Now coming to the improvements of the present invention, the pivot 49 instead of being carried directly by the lever 32 is connected to an arm of a bell crank lever 56, which is independently pivoted and carried by the lever 32 through the pivotal connection 57. Thus the upwardly extending portion of the lever 32 is yoke-shaped to receive therebetween the bell crank lever 56 which is formed with a shoulder 58 adapted to engage the base of the yoke-shaped portion of the lever 32 and prevent movement of the bell crank lever 56 in a clockwise direction, relative to the lever 32 from the position shown in Figure 1. The lever 56 can, however, move in a counterclockwise direction and this movement is resisted, since it would necessitate a compression of spring 59. The spring 59 is mounted on the lug 60 of an arm 61 integrally formed with the lever 32. The upper end of the spring 59 seats about a lug 62 integrally formed with an arm 63 of the bell crank lever 56. Operation of the power brake unit through the pedal 26 and during the movement of the vehicle will result in a rotation of the rock shaft 30 in a clockwise direction, which will therefore tend to turn the lever 32 and transmit a pull to both the rear brake rod 51 and the front brake rod 54. The movement will continue until the resisting force at the rear brakes exceeds the resistance of the spring 59 and further movement of the rock shaft will then increase the braking force at the front wheel brakes without increasing the braking at the rear wheel brakes, since the spring 59 will permit the increased braking by the front wheel brakes to be obtained. Operation of the manual control will pull on the front and rear wheel brakes, without effecting the spring 59.

The resilient means may be an initially stiff compression spring as shown in the drawings suitably proportioned with respect to the effective leverages of the main and sublevers to limit the rear brake pressure relative to the front.

In Figure 2 the front brake rod 54 is shown extending to cross shafts 70 connected to cams 71 for expanding the internal shoes 72 into engagement with the front brake drums 73. Pull back springs 74 are provided normally holding the linkage in released position. A somewhat similar arrangement is shown for the actuation of the rear wheel brakes 75 by the brake rod 51.

In Figures 5 and 6, 80 is the power brake housing from which extends the transverse output rock shaft 81 surrounded by the oil sealing unit 82 mounted in a recess of the housing. The distributing lever generally designated 83 has a central boss 84 bearing directly against the oil seal unit and held in place axially by the retaining disc 85 which bears at its flanged peripheral edge against the hub of the lever 83 and is secured by the centrally located screw bolt 86 which threads into the shaft 81. Buttress keys 87 seat in slots in the rock shaft and engage enlarged slots in the hub of the lever to permit a lost motion when the brakes are manually applied.

The lever 81 includes one member 88 having a depending lever arm 89 and a laterally extending lever arm 90 from the hub position. A yoke shaped portion 91 is formed with the hub and serves as a pivotal mounting for a second member 92 carried by the pivot pin 93. The member 92 has an upwardly extending lever arm 94 and a lateral projection 95 opposed to the projection or arm 90. Between the projections a compression spring 96 is disposed to hold the two members 88 and 92 in normal relative position. The member 92 further includes an integral stop projection 97 serving as a pickup to cause both arms to move as a unit during operation by a manual control.

An emergency lever 98 is shown carried by shaft 99 and having a lower lever arm 100 having fastened thereto a latch 101 for engaging the sector 102. The linkage 103 between arms 100 and 94 should be substantially in line with the rear brake rod 104. Since with any standard vehicle the relationship between the axis of the rock shaft 81, the axis of shaft 99 and the rear brake rod connection to the cross shafts will be substantially predetermined, it is apparent that the pivotal connection 105 for linkages 103 and 104 may come anywhere along the lever arm 94 at varying distances from the axis of shaft 81. The lower lever arm 89 which connects to the front brake rod 106 cannot usually be made long enough to compensate for the effective length of the upper lever arm. In such case the improved construction has a practical advantage in that the strength of spring 90 will determine the effective pressure on the rear brakes and may be proportioned to give the desired force on the front brakes.

In a desirable construction the compression spring need not be initially deformed or compressed but is held in place by positioning lugs or seats formed on the opposed arms. In such case the stop lug on the upper arm will be out of contact with its cooperating shoulder when the linkage is in released position. The lost motion at this point may be such that the rear brakes are initially engaged by the emergency control before the operation of the front wheel brakes. In such case the operation by the power unit will be entirely independent of the lost motion between the stop shoulders. As the brake linings wear there need be no adjustment as far as the power operation is concerned and an adjustment of the emergency linkage connection will cause the rear brakes to be immediately engaged upon movement of the hand lever.

It will be readily apparent that changes and modifications in the particular design or arrangement of the linkage may be made without departing from the spirit of the invention as expressed in the appended claims.

I claim:

1. In combination a primary power brake unit, means for actuating said power brake, secondary front and rear wheel brakes, non-resilient connections from the power brake unit to the front wheel brakes, resiliently limited connections to the rear wheel brakes and independent means for actuating said front and rear brakes without operation of the power brake unit through non-resilient connections.

2. In combination a power brake unit, an output rock shaft, a double arm distributing lever mounted on said rock shaft, non-resilient connections from one arm of said distributing lever to one set of brakes, a lever arm pivotally associated with the other arm of said distributing lever, non-resilient connections from said pivoted lever arm to the other set of brakes, and means normally preventing movement of said pivotal lever with respect to the distributing lever.

3. Brake mechanism including a distributing lever assembly associated with a brake actuating rock shaft, non-resilient connections from the opposite ends of said lever assembly to different sets of brakes and resilient means associated with said distributing lever assembly for limiting the operating movement of one of said non-resilient connections.

4. Brake actuating mechanism comprising a rock shaft, a double arm lever device mounted on said rock shaft, a lost motion connection between said rock shaft and said lever device, a brake rod connected to the lower arm of said lever device and an oppositely extending brake rod connected to the upper arm of said lever device, a manual control connected to the upper arm of said lever device in line with the second brake rod, the upper arm of said lever device comprising a pivoted sub-lever held in stop position relative to the lower arm when operated by said manual control.

5. Brake actuating mechanism for vehicle wheel brakes comprising independent means for actuating different sets of brakes, a power brake unit, means for operating said independent means by the actuation of said power brake unit, means for resiliently limiting the force transmitted to one set of brakes and manual means for actuating both sets of brakes through said independent means without limitation of the transmitted force.

6. Brake mechanism for motor vehicles comprising front wheel brake linkage, rear wheel brake linkage, means connecting said linkages with provision for limited relative movement therebetween, operator-controlled means directly actuating said front wheel brake linkage and producing movement of said rear wheel brake linkage through said connecting means and independent operator-controlled means for directly actuating said rear wheel brake linkage and producing movement of said front wheel brake linkage through said connecting means.

7. Brake mechanism for motor vehicles comprising front wheel brake linkage, rear wheel brake linkage, means connecting said linkages for limited relative movement therebetween, means resiliently opposing relative movement between said linkages in one direction, operator-controlled means directly actuating said front wheel brake linkage and producing movement of said rear wheel brake linkage through said resilient means and independent operator-controlled means directly actuating said rear wheel brake linkage and producing movement of said front wheel brake linkage without transmission of the braking force through said resilient means.

8. Brake mechanism for motor vehicles comprising power brake mechanism, front wheel brake linkage actuated directly by said power brake mechanism, rear wheel brake linkage relatively movable from normal position in one direction with respect to said front wheel brake linkage, resilient means limiting the relative movement between said linkages during actuation by said power braking mechanism and independent means directly actuating said linkages without permitting relative movement therebetween.

9. A distributing lever assembly for use in a brake linkage comprising a pair of pivotally-associated levers, connections from each of said levers to different brakes, means pivotally supporting one of said levers for movement about a fixed axis, means pivotally supporting the other of said levers on said first lever, means for directly actuating said first-mentioned lever and means resiliently limiting the force transmitted from said first-mentioned lever to the other lever, said last-named means permitting relative pivotal movement between said levers during actuation thereof.

10. A distributing lever assembly for use in a brake linkage comprising a pair of pivotally associated levers, connections from each of said levers to different brakes, means pivotally supporting one of said levers for movement about a fixed axis, means for directly actuating said last-mentioned lever, means resiliently limiting the force transmitted from said last-mentioned lever to the other lever and independent means for directly actuating said other lever.

11. In a brake linkage for operating four-wheel brakes, a pivoted rock shaft, a brake lever carried thereby, connections from said brake lever for actuating one set of brakes, a second brake lever pivotally supported by said first brake lever, connections from said second brake lever for actuating a different set of brakes, means for operating said rock shaft and means resiliently limiting the transfer of the braking force from said first brake lever to said second brake lever.

12. In a brake linkage for operating four-wheel brakes, a pivoted rock shaft, a bell crank lever carried by said rock shaft, connections from one arm of said bell crank lever to one pair of brakes, a second bell crank lever pivotally carried by said first bell crank lever, connections from one arm of said second bell crank lever to the other pair of brakes, said bell crank levers having their other arms in opposed relationship, a compression spring supported between said last-mentioned arms of said bell crank levers and means for operating said rock shaft whereby the braking force transmitted to said second bell crank lever is resiliently limited by said spring.

13. In a brake linkage for actuating four-wheel brakes, a pair of pivotally associated levers, said levers having opposible stop faces for limiting relative pivotal movement therebetween in one direction, resilient means opposing relative pivotal movement between the levers in the other direction, means pivotally supporting one of said levers for movement above a fixed axis, brake actuating connections from each of said levers to different pairs of brakes, means for actuating the lever which is pivoted on a fixed axis whereby the braking force is resiliently transmitted from said last-mentioned lever to the other lever and independent means for actuating said other lever whereby said levers are turned as a unit about the fixed axis due to engagement of said stop faces.

Signed at Chicago, Illinois, this 27th day of January, 1930.

EDWARD A. ROCKWELL.